United States Patent
Shuck et al.

(10) Patent No.: US 11,890,682 B2
(45) Date of Patent: Feb. 6, 2024

(54) SEMI-COMPLIANT FASTENERS FOR MECHANICAL LOCKING

(71) Applicant: Rolls-Royce Corporation, Indianapolis, IN (US)

(72) Inventors: Quinlan Yee Shuck, Indianapolis, IN (US); Scott Nelson, Carmel, IN (US); Raymond Ruiwen Xu, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 65 days.

(21) Appl. No.: 17/348,360

(22) Filed: Jun. 15, 2021

(65) Prior Publication Data
US 2021/0387257 A1 Dec. 16, 2021

Related U.S. Application Data

(60) Provisional application No. 63/039,442, filed on Jun. 15, 2020.

(51) Int. Cl.
*B22F 7/06* (2006.01)
*B28B 11/24* (2006.01)
*B33Y 80/00* (2015.01)
*B22F 10/18* (2021.01)

(52) U.S. Cl.
CPC .............. *B22F 7/062* (2013.01); *B22F 10/18* (2021.01); *B28B 11/243* (2013.01); *B33Y 80/00* (2014.12)

(58) Field of Classification Search
CPC ........................................................ B22F 7/062
See application file for complete search history.

(56) References Cited

U.S. PATENT DOCUMENTS

| | | | |
|---|---|---|---|
| 3,672,881 A | 6/1972 | Sowko, Sr. | |
| 5,945,019 A * | 8/1999 | Tanaka | F02P 19/00 219/544 |
| 6,648,597 B1 | 11/2003 | Widrig et al. | |
| 7,989,084 B2 * | 8/2011 | Janecek | H02K 1/02 428/548 |
| 8,790,439 B2 | 7/2014 | Mirchandani et al. | |
| 2010/0038012 A1 * | 2/2010 | Tucker | B22F 7/062 138/143 |
| 2013/0156626 A1 * | 6/2013 | Roth-Fagaraseanu | B22F 7/062 419/6 |
| 2022/0097136 A1 * | 3/2022 | Freeman | B22F 10/00 |

* cited by examiner

*Primary Examiner* — Christopher S Kessler
(74) *Attorney, Agent, or Firm* — Shumaker & Sieffert, P.A.

(57) ABSTRACT

A method for connecting or joining a first substrate and a second substrate across an interface between the first substrate and the second substrate. The method includes disposing a fastener precursor in the bore and sintering the fastener precursor in the bore. The fastener precursor densifies and shrinks in at least one dimension to mechanically interlock with a contour in the bore and form a mechanical fastener in the bore, and the mechanical fastener forms an interlock between the first substrate and the second substrate.

18 Claims, 8 Drawing Sheets

SEMI-COMPLIANT FASTENERS FOR MECHANICAL LOCKING

This application claims the benefit of U.S. Provisional Application Ser. No. 63/039,442, entitled "SEMI-COMPLIANT FASTENERS FOR MECHANICAL LOCKING", filed on Jun. 15, 2020, the entire content of which is incorporated herein by reference.

BACKGROUND

To join together two substrates having different coefficients of thermal expansion (CTE) to form an assembly, a metal joint formed using conventional joining techniques such as welding and brazing, or a metal connector such as a screw, rivet or clip, can allow relatively rapid heat transfer from one substrate to another. If one of the substrates is subjected to high temperatures in, for example, an aerospace application, and the attached substrate is more sensitive to heat, this heat transfer can damage all or a portion of the assembly. Ceramic fasteners reduce heat transfer, but are less compliant than metal joints, and are prone to fail at the threads and other contact points when subjected to large expansion differences at an interface between adjacent substrates.

Fasteners are needed that can provide a desired level of joining force and compliance between substrates having different CTEs, or that are expected to experience a large temperature gradient across a contact interface between the substrates.

SUMMARY

In general, the present disclosure is directed to mechanical fasteners formed from a sinterable fastener precursor. In various examples, the sinterable fastener precursor can be a composition that is injected into a bore in a substrate and conforms to the contours of the bore, or can be an article pre-formed into a desired shape prior to insertion into the bore. When the sinterable fastener precursor is sintered within the bore to form a mechanical fastener, all or a selected portion of the composition shrinks in at least one dimension and mechanically engages or interlocks with a feature of the bore or a feature of one of the substrates to form a mechanical fastener useful to, for example, connect adjacent substrates to each other. In some examples, when the sinterable fastener precursor composition is sintered within the bore, all or a selected portion of the composition shrinks and mechanically engages a shoulder or other feature of the bore to provide a compliant plug engaged in the bore.

The sinterable fastener precursor may be selected to provide a desired level of at least one of mechanical interlock, connecting force, compliance, and heat resistance suitable for a selected substrate material or intended use of an assembly.

In one example, the sinterable fastener precursor may be selected to provide a compliant mechanical fastener between substrates having different coefficients of thermal expansion, or to provide a heat resistant mechanical fastener that resists heat transfer across an interface between two substrate materials. For example, the mechanical fasteners derived from the sinterable fastener precursor have been particularly useful to fasten a heat shield to an underlying heat-sensitive substrate material. In another example, an external part such as a spar that is exposed to extreme temperatures can be fastened to a more temperature sensitive internal part. In another example, a plug derived from the sinterable fastener precursor may be selected to seal an external aperture in a complex casting, which can reduce the number of welding steps required to complete the casting process.

In one aspect, the present disclosure is directed to a method for connecting or joining a first substrate and a second substrate across an interface between the first substrate and the second substrate. The method includes disposing a fastener precursor in the bore and sintering the fastener precursor in the bore. The fastener precursor densifies and shrinks in at least one dimension to mechanically interlock with a contour in the bore and form a mechanical fastener in the bore, and wherein the mechanical fastener forms an interlock between the first substrate and the second substrate.

In another aspect, the present disclosure is directed to an assembly including a first substrate contacting a second substrate; a bore extending through the first substrate and the second substrate; and a sintered fastener extending through the bore, wherein the sintered fastener mechanically interlocks the first substrate to the second substrate.

In another aspect, the present disclosure is directed to a method including casting a metal part, wherein the metal part includes at least one casting aperture, and wherein the casting aperture has at least one contour; injecting a sinterable composition into the casting aperture; and sintering the sinterable composition in the aperture. The sinterable composition densifies and shrinks in at least one dimension and mechanically interlocks with the contour in the aperture to form a plug in the aperture.

In another aspect, the present disclosure is directed to a method including aligning a first countersunk bore in a first substrate and a second countersunk bore in a second substrate so that the first countersunk bore and the second countersunk bore overline each other; injecting a sinterable fastener precursor composition into at least one of the first and the second countersunk bores; sintering the fastener precursor composition to form a mechanical fastener comprising a first portion contacting a first chamfered surface in the first countersunk bore, a second portion contacting a second chamfered surface in the second countersunk bore, and an elongate linear portion between the first portion and the second portion; wherein the mechanical fastener applies a connecting force between the first chamfered surface and the second chamfered surface to maintain a connection between the first substrate and the second substrate.

In another aspect, the present disclosure is directed to an assembly including a first substrate contacting a second substrate; a bore extending through the first substrate and the second substrate; and a sinterable fastener precursor composition in the bore, wherein a mechanical fastener derived from the sinterable fastener composition is configured to mechanically interlock the first substrate to the second substrate.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1A:
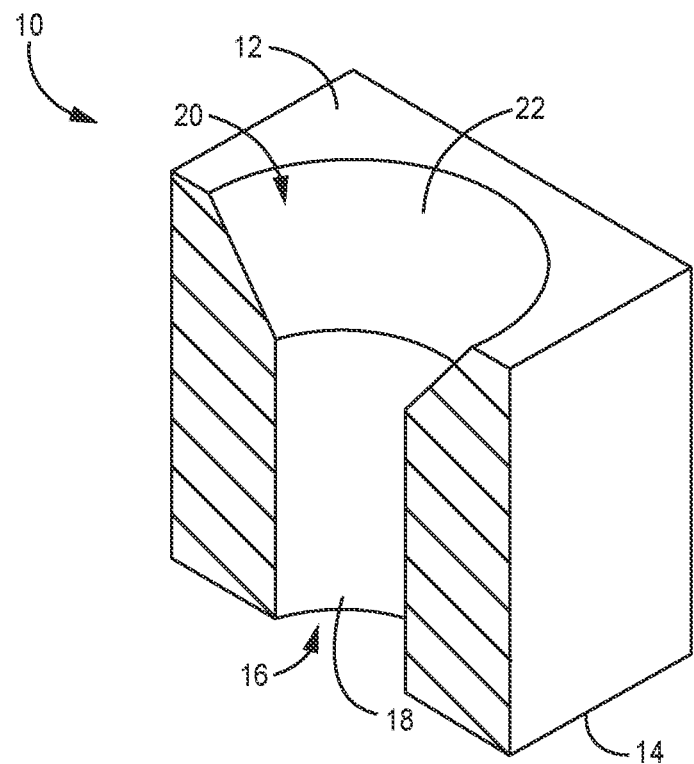
FIG. 1A is schematic cross-sectional perspective view an example of a substrate including a countersunk bore with a chamfer.

Referring now to FIG. 1A, a schematic illustration of a substrate 10 includes a first major surface 12 and an opposed second major surface 14. A bore 16 extends from the first major surface 12 to the second major surface 14. The bore 16 includes a linear portion 18 and a chamfer 20. The chamfer 20 includes a shoulder 22 configured to seat or engage a selected portion of a mechanical fastener (not shown in FIG. 1A).

Figure 1B:
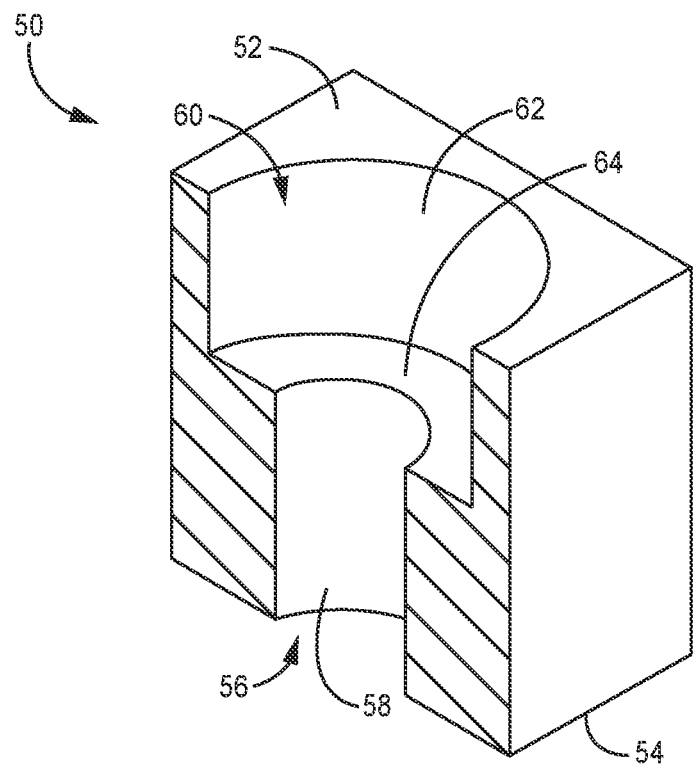
FIG. 1B is schematic cross-sectional perspective view an example of a substrate including a counterbored hole with a shoulder.

In another example shown schematically in FIG. 1B, a substrate 50 includes a first major surface 52 and a second major surface 54. A bore 56 extends from the first major surface 52 to the second major surface 54. The bore 56 includes a linear portion 58 and a counterbored portion 60. The counterbored portion 60 includes a first bored region 62 and a shoulder 64 selected to seat or engage a selected portion of a mechanical fastener (not shown in FIG. 1B).

FIGS. 1A-1B are provided as examples of contours or surface features in a bore, which are not intended to be limiting. A wide variety of contours may be utilized to mechanically interlock with the fasteners described below.

Figure 2A:
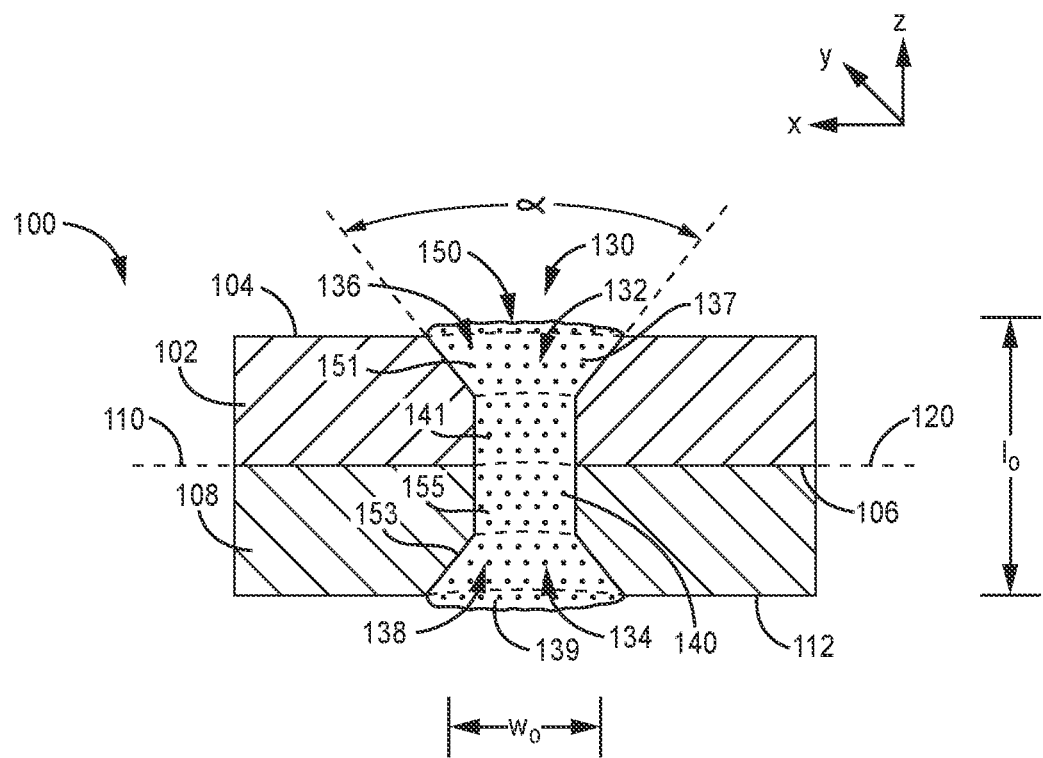
FIG. 2A is a schematic cross-sectional view of an example of an assembly including chamfered bores having therein a fastener precursor according to the present disclosure.

Referring now to FIG. 2A, an assembly 100 includes a first substrate 102 with a first major surface 104 and a second major surface 106. The assembly 100 further includes a second substrate 108 with a first major surface 110 and a second major surface 112. In the example of FIG. 2A, the second major surface 106 of the first substrate 102 contacts the first major surface 110 of the second substrate 108 at an interface or joint 120.

The substrates 102, 108 may be made from a wide variety of materials including, for example, metals and metal alloys, polymeric materials, ceramics, ceramic composites including inorganic fibers such as aluminum oxide ($Al_2O_3$), mullite ($A_6Si_2O_{13}$), zirconium oxide ($ZrO_2$), carbon (C), graphite, silicon carbide (SiC), silicon carbon nitride, silicon nitride, and mixtures and combinations thereof.

In some examples, the first substrate 102 and the second substrate 108 have a different coefficient of thermal expansion (CTE). For example, one or more of the substrates may be notch sensitive in tensile loading (like a ceramic), so the process of the present disclosure may provide improved joining for such substrates relative to conventional fasteners. In some examples, which are not intended to be limiting, the first substrate 102 and the second substrate 108 have CTEs that differ by at least about 5%, at least about 10%, at least about 20%, or at least about 30%.

In one example, the substrates 102, 108 are part of a mechanical system such as a gas turbine that is intended to operate in high temperature environment. In some examples, which are not intended to be limiting, the substrates may form a component of a gas turbine engine such as, e.g., a combustor liner, a heat shield, a blade track, an exhaust liner, and the like. In another example, one or both of the substrates 102, 108 are heat tiles.

In some examples, one or both of the substrates 102, 108 may include a material suitable for use in a high-temperature environment such as a superalloy. Suitable superalloys include, but are not limited to, an alloy based on Ni, Co, Ni/Fe, or the like. In examples in which substrates 102, 108 include a superalloy material, the substrate may also include one or more additives such as titanium (Ti), cobalt (Co), or aluminum (Al), which may improve the mechanical properties of substrate including, for example, toughness, hardness, temperature stability, corrosion resistance, oxidation resistance, or the like.

In some examples, the substrates 102, 108 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); zirconia; combinations thereof; or the like. In some examples in which the substrates 102, 108 include a ceramic, the ceramic may be substantially homogeneous.

In examples in which the substrates 102, 108 include a CMC, either or both substrates may include a matrix material and a reinforcement material. The matrix material may include, for example, silicon or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), zirconia, silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

The assembly 100 includes a countersunk bore 130 extending from the first major surface 104 of the first substrate 102 to the second major surface 112 of the second substrate 108. The bore 130 includes a first chamfer 132 in the first substrate 102, and a second chamfer 134 in the second substrate 108. In various examples, which are not intended to be limiting, the chamfers 132, 134 can have a wide range of chamfer angles α ranging from about 60° to about 120°, and the angles of the chamfers 132, 134 can be the same or different. The chamfers 132, 134 have shoulders 136, 138, respectively, which are configured to seat a mechanical fastener. In some examples, an optional elongate linear middle portion 140 of the bore extends across the interface 120. For example, the angles and shape of the chamfers 132, 134 can be selected to adjust preload and compliance of a mechanical fastener across the interface 120 to reduce stress on the materials caused by thermal expansion. In some examples, shrinkage of the fastener precursor may also be tailored to adjust preload and compliance.

A fastener precursor 150 resides in the bore 130, and extends from the first major surface 104 of the first substrate 102 to the second major surface 112 of the second substrate 108. The fastener precursor 150 can be formed from any sinterable material that can be further processed to form a mechanical fastener in the bore 130. As shown in FIG. 2A, the fastener precursor 150 includes portions 151, 153 that contact the respective surfaces 137, 139 of the chamfers 136, 138, as well as a portion 155 that contacts the walls 141 of the middle portion 140 of the bore 130. The fastener precursor 150 has an initial size along the z-direction of $l_o$, as well as a size along the x-direction of $w_o$, as well as a size along the y-direction of $d_o$ (not shown in FIG. 2A).

In some examples, the fastener precursor 150 is in the form of a sinterable composition that is injected or otherwise deposited in the bore 130. In one example, the fastener precursor is a powdered metal composition. Suitable metal or alloy powders for the powdered metal composition may include a high-performance metal or alloys for forming component used in mechanical systems, such as a steel (e.g., stainless steel), a nickel-based alloy, a cobalt-based alloy, a titanium-based alloy, or the like. In some examples, the metal or alloy powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy powder may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, WI. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, MI. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, NJ, or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi.

In some examples, the powdered metal composition may be formed in-situ in the bore, or outside of the bore, using a fused filament fabrication (FFF) process. In FFF processes a material including a sacrificial binder and a powder including at least one powdered metal dispersed in the binder may be deposited to form an additively manufactured component. After additively forming one or more layers of the component, or after forming the entire component, the binder may be selectively removed or sacrificed from the layers or the component, for example, using heating, chemical dissolution, or the like. Sacrificing the binder from the layers or the component may leave substantially only the metal powder in the layers or the component. The component may be further treated, for example, by sintering, to strengthen or densify the powder and form the additively manufactured component.

In some examples, in addition to a metal or alloy powder, the metal powder composition may include a ceramic, such as an oxide. For example, the powder may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide. In various examples, the particles may have a wide variety of regular or irregular shapes including, for example, spheres, rods, disks, and the like.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

In some examples, the metal powder composition also includes an optional sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The metal or alloy powder may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. The curable polymer precursor may include a precursor, for example, one or more monomers, oligomers, or non-crosslinked polymers suitable for forming the polymeric material of the sacrificial binder upon curing or sintering.

The metal powder composition making up the fastener precursor 150 may include a selected amount of sacrificial binder and metal or alloy powder so that the material in the fastener precursor composition includes more than about 65%, or more than about 80%, by volume of the metal or alloy powder, which may result in a substantially rigid component with reduced porosity being formed in response to removal of the sacrificial binder.

In some examples, the metal powder composition forming the fastener precursor 150 includes sacrificial binder in an amount configured to cause the material to shrink by less than about 20 volume percent relative to an initial volume of the material in response to removing the sacrificial binder. In one example, which is not intended to be limiting, the metal powder composition 150 may include less than about 20% by volume of the sacrificial binder. In various examples, the amount of the sacrificial binder can be tailored for a particular application. For example, 1% shrinkage would give low conductivity and a friable fastener that could break sacrificially to preserve the substrate(s) intact. In another example, a mostly dense fastener (for example, less than about 2% porosity) would maximize strength.

In some examples, the metal powder composition forming the fastener precursor 150 includes at least one optional shrink-resistant agent. For example, the at least one shrink-resistant agent may include a ceramic, instead of, or in addition to, the oxide in any ODS present in the material(s). For example, some shrinkage may be advantageous to impart preloaded clamping force and compliance for CTE mismatched substrate materials, but shrink resistance could reduce compliance to lateral motion.

In another example, the fastener precursor 150 may include a ceramic composition. In various examples, which are not intended to be limiting, suitable ceramic materials include, but are not limited to, aluminum nitride, aluminum diboride, boron carbide, aluminum oxide, mullite, zirconium oxide, carbon, silicon carbide, silicon nitride, transition metal nitrides, transition metal borides, rare earth oxides, and mixtures and combinations thereof. In some examples, the slurry may also contain a reactive additive composed of a source of carbon such as graphite, carbon or diamond particulate, or a high char-yielding resin.

The size of the particles in the ceramic composition forming the fastener precursor 150 may vary widely depending on the intended application of the assembly 100. In some examples, the particles have a major dimension of less than about 50 microns (μm). In various examples, the particles may have a wide variety of regular or irregular shapes including, for example, spheres, rods, disks, and the like. In various examples, the major dimensions of the particles may form a monomodal, a bimodal, or a multimodal distribution. In some examples, the particles are spheres with a diameter of less than about 50 μm, and the diameters of the particles make up a multimodal distribution to more effectively flow within the bore 130.

In some examples, the ceramic composition further includes a metal alloy or metalloid such as, for example, Si, B, Al, Y, Ti, Zr, oxides thereof, and mixtures and combinations thereof.

In some examples, the ceramic composition forming the fastener precursor 150 further incudes a sacrificial polymeric binder such as those listed above as suitable for the metal powder composition including, polyvinyl alcohol, polyolefins, polystyrene, acrylonitrile butadiene styrene, polylactic acid, thermoplastic polyurethanes, aliphatic polyamides, or the like, or combinations thereof.

In some examples, the fastener may be formed from a polymeric ceramic precursor that can be subsequently pyrolyzed or sintered to yield a ceramic fastener such as, for example, SiC.

Figure 2B:
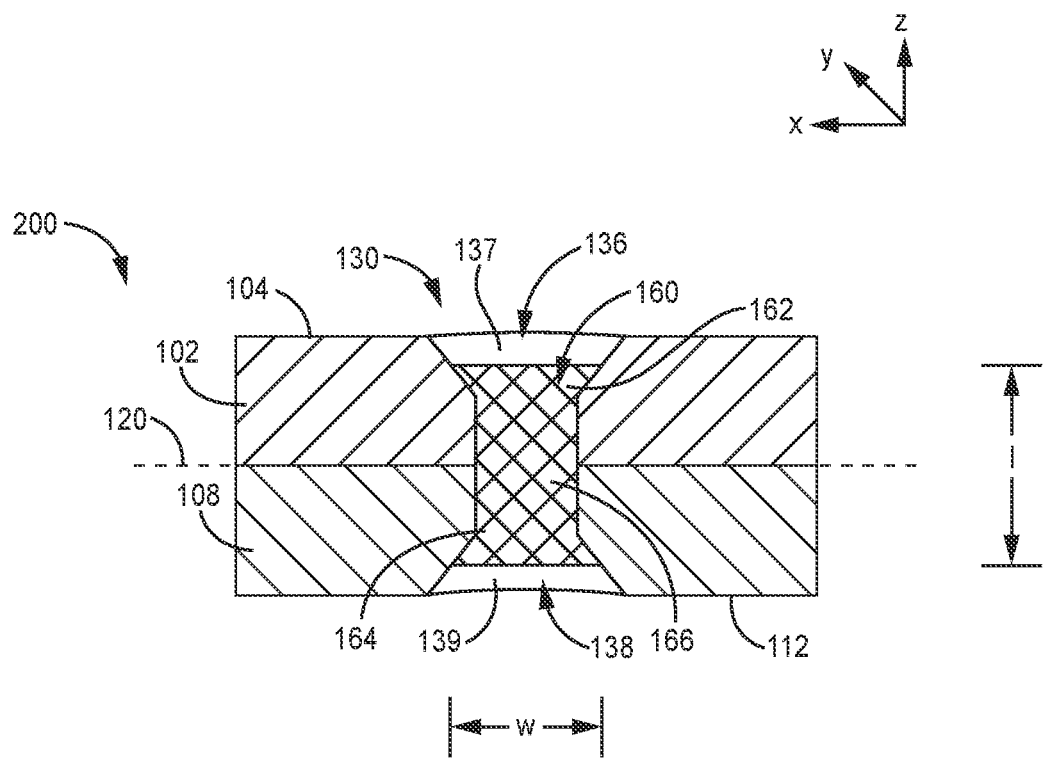
FIG. 2B is a schematic cross-sectional view of the example of the assembly of FIG. 2A after the fastener precursor is sintered in the bore to form a mechanical fastener in the bore.

As noted above, the metals and ceramic materials selected for use in the fastener precursor 150 may be selected a provide a desired combination of strength, heat resistance, compliance, and the like when the fastener precursor 150 is sintered to form a mechanical fastener that provides a connection between the first substrate 102 and the second substrate 108 (FIG. 2B). In addition, the sacrificial binders selected for used in the fastener precursor, as well as the amount of the sacrificial binders utilized in the precursor, can provide a desired level of porosity for the mechanic fastener derived from the fastener precursor 150. In one example, to enhance the strength of the mechanical joint derived from the fastener precursor composition, the powdered metal selected for the fastener precursor composition 150 may be the same as or substantially similar to the composition of the substrates 102, 108. Similarly, for a ceramic substrate 102, 108, a ceramic fastener precursor composition can in some cases provide enhanced strength when sintered to form a mechanical fastener.

In another example, the fastener precursor 150 is a sinterable connector preform that can be made in advance and inserted in the bore 130. In some examples, which are not intended to be limiting, the sinterable connector preform can be made using a fused filament fabrication (FFF) process.

Referring now to FIG. 2B, the fastener precursor 150 in the bore 130 of FIG. 2A is sintered in the bore 130 to form a mechanical fastener 160. In the present application, the term mechanical fastener refers to fasteners that do not bond or fuse with the surrounding substrate materials following the sintering step, and form a mechanical interlock with a contour of feature of the substrate material such as a surface, an angled wall, a shoulder, a chamfer, and the like.

Sintering may be performed using any suitable technique such as, for example, direct metal laser sintering, electron beam melting, selective laser sintering, or the like, which use a directed energy beam to fuse and densify the materials in the fastener precursor 150.

Before, after, or during the sintering step, the fastener precursor 150 may optionally be mechanically deformed or machined to further shape the fastener precursor 150 into the fastener 160. For example, pressure may be applied to the fastener precursor 150 along the z-direction along to cause further compaction of the materials in the fastener precursor 150, or to cause the fastener precursor 150 to take on the shape of the bore 130. In another example, a tool may be impacted against the fastener precursor 150 along the z-direction to cause the fastener precursor 150 to flare outwardly along the x or y direction to enhance contact with the chamfer surfaces 137, 139 or other feature in the bore, or against the exposed surfaces 104, 112 of the assembly. In another example, an aperture or a central bore may be drilled in the fastener precursor 150 along the z direction.

Following the sintering step, the fastener precursor 150 is densified and at least one of the original dimensions including, but not limited to, $l_o$, $w_o$, of the fastener precursor 150 shrink to l, w, which makes the overall size of the resulting mechanical fastener smaller in at least one dimension relative to the precursor 150 from which it is derived. In various examples, the densification and shrinkage that occurs during sintering can exert a mechanically interlocking force on features of the bore 130, or against the substrate surfaces 104, 112, along any or all of the x, y and z directions.

For example, in FIG. 2B, the mechanical fastener 160 includes a first trapezoidal portion 162 contacting the surface 137 of the chamfer 136, and a second trapezoidal portion 164 contacting the surface 139 of the chamfer 138. In various examples, the trapezoidal portions 162, 164 can be the same or different, depending on, for example, the intended application of the final assembly 200, the compositions of the substrates 104, 108, and the material selected to form the mechanical fastener 160. The mechanical fastener 160 further includes an elongate linear portion 166 connecting the trapezoidal portions 162, 164.

In one example, if the elongate linear portion 155 of the fastener precursor (FIG. 2A) shrinks along the z-direction to form the linear portion 166 of the fastener 160, a force is applied along the z-direction. The linear portion 166 of the fastener 160 exerts force on the trapezoidal portions 162, 164, which in turn mechanically engage or interlock with and exert force on the surfaces 137, 139 of the chamfers 136, 138. In some examples, the force exerted across the interface 120 exerts a connecting force that maintains the connection between the substrates 104, 108.

In some examples, not shown in FIGS. 2A-2B, the bore 130 can be overfilled with the fastener precursor so that the resulting sintered fastener can be substantially flush with either or both of the exposed surfaces 104, 112 of the substrates 102, 108. In addition, in some examples the fastener 160 can be further machined to match the contours of the substrate or to create a desired surface shape for the fastener 160 or contour for the exposed surfaces 104, 112 of the substrates 102, 108.

Figure 3:
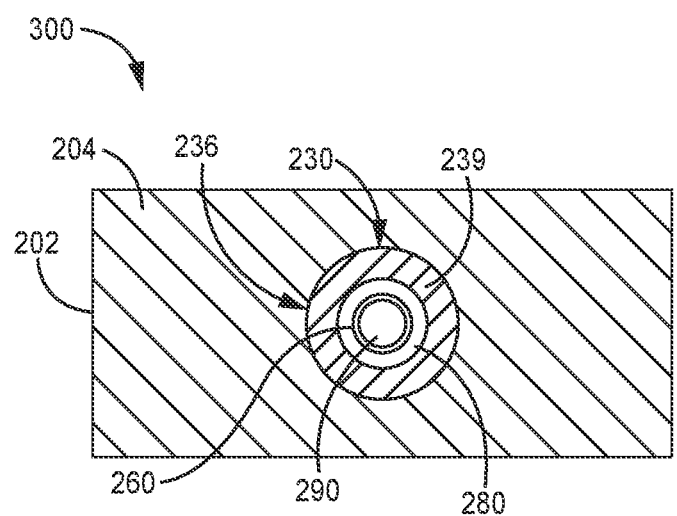
FIG. 3 is a schematic overhead view of a substrate including a chamfered bore with a mechanically interlocking fastener therein the fastener including an encapsulating layer and an aperture.

Referring now to FIG. 3, in another example an assembly 300 includes a substrate 202 having a major surface 204. A bore 230 includes a chamfer 236 with an angled chamfer surface 239. A mechanical fastener 260 disposed in the bore 230 includes an encapsulating layer 280 between the mechanical fastener 260 and the substrate 202 to improve compatibility between the mechanical fastener 260 and the material forming the substrate 202. In one non-limiting example that is provided for the purpose of illustration, if the mechanical fastener 260 is derived from a powdered metal composition, the protective layer 280 may be made from an encapsulating shell of a ceramic material so that the mechanical fastener 260 does not bond to the substrate 202.

In the example of FIG. 3, the mechanical fastener 260 further includes a central bore 290. As noted above, the fastener precursor from which the mechanical fastener is derived may be formed with a central bore prior to sintering, or the bore may be formed in the as-sintered mechanical fastener 260 by mechanical drilling, laser drilling, punching, and the like.

Figure 4:
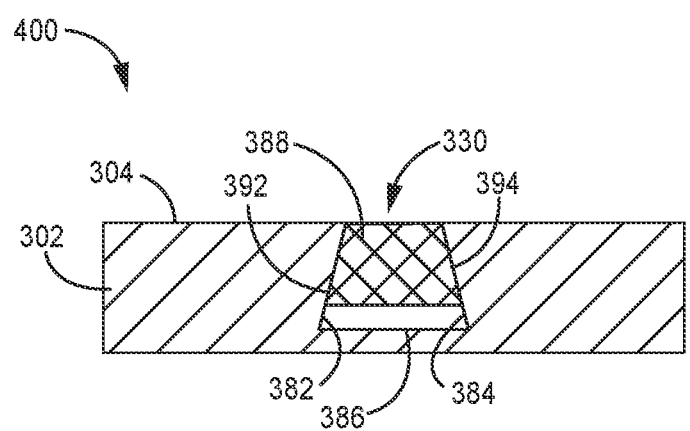
FIG. 4 is a schematic cross-sectional view of a substrate including a mechanically interlocking plug derived from an in-situ sintered fastener precursor according to the present disclosure.

In another example shown schematically in FIG. 4, a part 400 includes a substrate 302 with an exposed surface 304 and an aperture or bore 330. The bore 330 includes angled walls 382, 384 and a bottom surface 386. A plug 388 disposed in the bore 330 is derived from a fastener precursor composition (not shown in FIG. 4) sintered in-situ in the bore 330. The angled surfaces or contours of the plug 388 (e.g., 392 and 394) mechanically interlock with the walls 382, 384 of the bore 330 to retain the plug 388 in the substrate 302. As noted above, in one non-limiting example, in-situ sintered plugs can reduce or eliminate the need to close casting holes in a part using welding steps, which can reduce manufacturing costs of complex metal parts. As noted above, the mechanically interlocking plugs 388 can optionally be machined to provide a desired finish on the surface 304 of the substrate 302.

Figure 5:
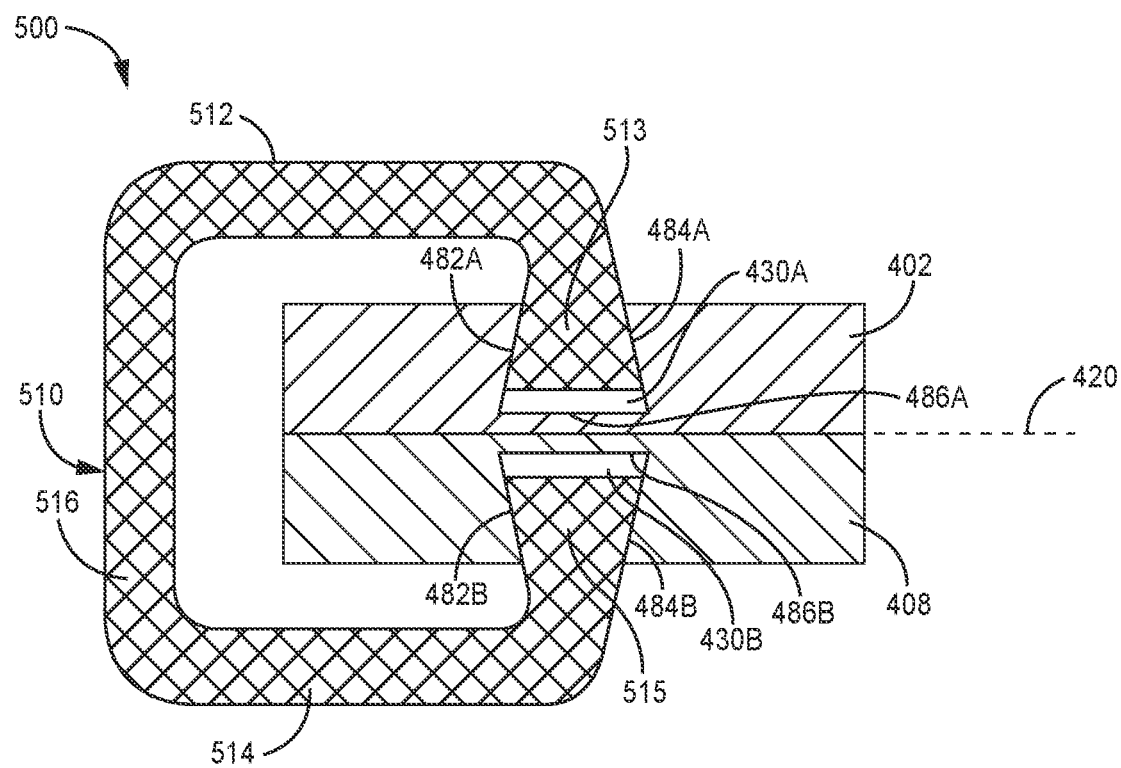
FIG. 5 is a schematic cross-sectional view of an example of an in-situ sintered clip-like fastener maintaining connection between two substrates.

Referring now to FIG. 5, an assembly 500 includes a first substrate 402 and a second substrate 408. The first substrate 402 includes a first bore 430A, and the second substrate 408 includes a second bore 430B. The first bore 430A includes angled walls 482A, 484A and a bottom surface 486A, and the second bore 430B includes angled walls 482B, 484B, as well as a bottom surface 486B.

A clip-like fastener 510 includes a first arm 512 having a plug portion 513 disposed in the first bore 430A. A second arm 514 of the fastener 510 includes a plug portion 515 disposed in the second bore 430B. A middle tensioning arm 516 connects the first arm 512 and the second arm 514.

In one example, which is not intended to be limiting, the fastener 510 may be formed using a process such as fused filament fabrication (FFF), and then the components of the fastener 510 are sintered and undergo densification and shrinkage in at least one direction. The plug portions 513, 515, are sintered in-situ in the respective bores 430A and 430B. During sintering the plug portions 513, 515 shrink in at least one dimension such that the angled surfaces or contours thereof mechanically interlock with the walls 482A, 484A and 482B, 484B to retain the fastener in the substrates 402, 408. The arms 512, 514, which are themselves tensioned by the middle tensioning arm 516, exert force against the walls 482A, 484A in the first substrate 402 and against the walls 482B, 484B in the substrate 408 and provide a mechanical interlock or a connecting force across an interface 420 to maintain connection of the substrates 402 and 408. In various examples, the level of connecting force exerted by the clip-like fastener 510 across the interface 520 can be adjusted by configuring the shape and material composition of the components 512, 514, 516, as well as the shape and the material composition of the plug portions 513, 515.

Figure 6:
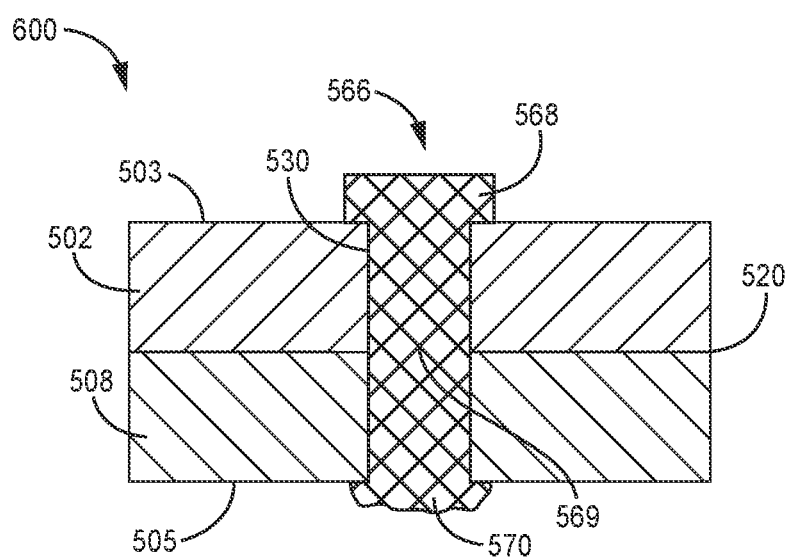
FIG. 6 is a schematic cross-sectional view of an example of a fastener maintaining a connection between two substrates.

Referring now to FIG. 6, an assembly 600 includes a first substrate 502 with an exposed major surface 503, and a second substrate 508 with an exposed surface 505. The first substrate 502 and the second substrate 508 contact each other at an interface 520. A bore 530 extends through the first substrate 502 and the second substrate 508. A mechanical fastener 566 is in the bore 530. The mechanical fastener 566 includes a head 568 contacting the exposed major surface 503 of the first substrate 502, and an elongate shank 569 extending through the bore 530. A flattened portion 570 of the shank 569 contacts the exposed major surface 505 of the second substrate 508.

In one example, which is not intended to be limiting, the fastener 566 is derived from a sinterable fastener precursor (not shown in FIG. 6) that is inserted into the bore 530. For example, the flattened portion 570 may be formed prior to or during the sintering process by impacting a tool against the shank 569. When the fastener precursor is then sintered in the bore 530 to form the mechanical fastener 566, the fastener precursor densifies and shrinks in at least one dimension, which provides a mechanical interlock or a connecting force across the interface 520 to maintain a connection between the substrates 502, 508.

Figure 7:
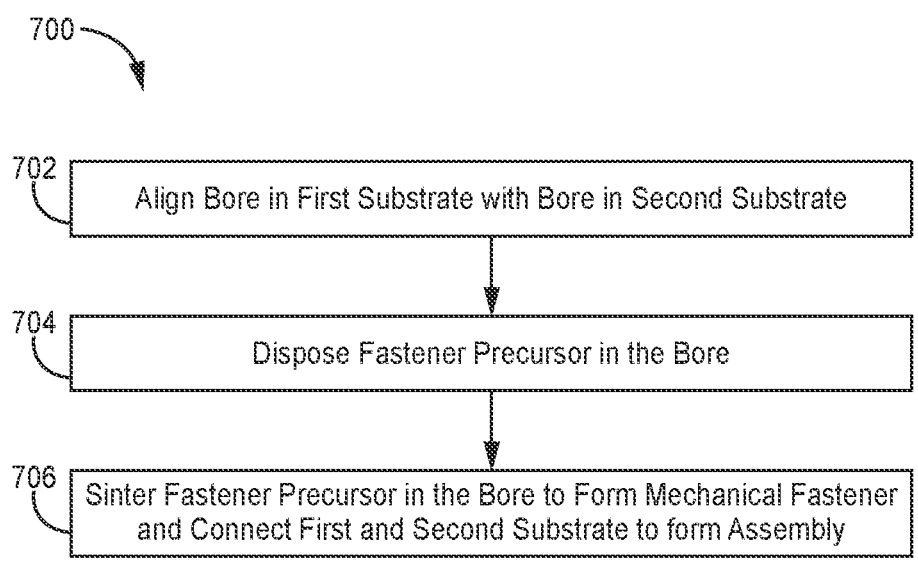
FIG. 7 is a flow diagram of an example of a process for making an assembly using a sintered fastener.

FIG. 7 is a flow diagram that describes a general process 700 of making a mechanical fastener according to the present disclosure. In the process 700, in a first step 702, a first substrate and a second substrate, each having bores therethrough, are aligned such that the bores at least partially overlie each other. The bores may be formed in the substrates using a wide variety of techniques including, for example, by drilling or other mechanical removal processes, by a chemical removal process such as etching, by removal with a laser or other directed energy source, or by forming the substrates with included bores using a molding or casting process.

In step 704, a fastener precursor is disposed in the aligned bore. As noted above, in various examples the fastener precursor is injected into the bore as a sinterable composition, which may be a preformed fastener formed using a FFF process or another three-dimensional (3D) printing process, or may be inserted as a preformed plug.

In step 706, the fastener precursor is sintered in the bore to form a mechanical fastener that mechanically attaches the first and second substrates to form an assembly. The in-situ sintering step causes the fastener precursor to densify and shrink in at least one dimension, which applies a mechanical interlock between the first and the second substrates.

In some examples, the sintering technique of step 706 includes, after forming the fastener precursor, sacrificing the binder from the as-formed component. The sacrificing may include delivering thermal or any suitable energy to the fastener precursor in an amount sufficient to cause binder to be substantially oxidized, incinerated, carbonized, charred, decomposed, or removed from the fastener precursor, while leaving the metal or alloy powder substantially intact. In other examples, the fastener precursor may be heated in a furnace to cause removal of the binder.

In some examples, after sacrificing the binder, sintering the component may include a thermal treatment, for example, one or more predetermined cycles of exposure to predetermined temperatures for predetermined times. In various examples, which are not intended to be limiting, the sintering may be accomplished by heating the assembly in a furnace, by heating with a laser or other directed-energy beam, and the like. The sintering may include a thermal treatment, for example, one or more predetermined cycles of exposure to predetermined temperatures for predetermined times.

In some examples, the sintering may promote the bonding of particles of powder to each other to strengthen the fastener. Sintering may not melt the particles of powder, thus leaving the microstructure of the particles substantially intact. This may facilitate forming fasteners with selected microstructures compared to techniques that include melting the powder. The sintering may also densify an interior or a surface region of the component, for example, by promoting powder compaction and reducing porosity. In some examples, the steps of removing the sacrificial binder and sintering the component may be combined in a single heating step or series of heating steps, e.g., within a furnace.

In some examples, if the fastener precursor is made using a FFF process, all or a portion of the binder in the fastener precursor can be removed in a separate heating step prior to sintering, or during the sintering step.

In another example, the present disclosure is directed to connection method for connecting or joining a first substrate and a second substrate across an interface between the first substrate and the second substrate. The method includes forming a bore extending across the interface. In some examples, opposed ends of the bore include features or contours such as shoulders, chamfers, undercuts, and the like.

A fastener precursor is then disposed in the bore, and portions of the fastener precursor contact the features or contours in the bore. As noted above, the fastener precursor may be deposited in the bore as a metal powder or ceramic composition, or may be a preformed fastener made using, for example, a fused filament fabrication process, and subsequently inserted in the bore following the fabrication step.

The fastener precursor is then sintered in-situ in the bore such that the fastener precursor shrinks and mechanically interlocks with the contours in the bore. The mechanical interlock mechanically interlocks the first substrate and the second substrate across the interface and forms a mechanical fastener in the bore.

In another example, the present disclosure is directed to a method for joining two substrates. The method includes forming countersunk bores in each substrate, and then aligning the first countersunk bore and the second countersunk bore so that the first countersunk bore and the second countersunk bore overline each other. A sinterable fastener precursor composition is then disposed in at least one of the first and the second countersunk bores. The fastener precursor composition is then sintered in the bore to form a mechanical fastener that mechanically interlocks with the chamfers in the first and the second countersunk bores. The mechanical fastener mechanically interlocks the first chamfered surface and the second chamfered surface to maintain a connection between the first substrate and the second substrate.

In another example, the present disclosure is directed to a method for connecting a first substrate and a second substrate across an interface between the first substrate and the second substrate. The method includes forming a bore with a middle portion extending across the interface, wherein the bore include a first end and a second end, and wherein the first end of the bore includes a first portion in the first substrate and the second end of the bore includes a second portion in the second substrate. The first and the second portions of the bore each include a contour such as a shoulder, a chamfer, an undercut and the like.

A fastener precursor is then inserted in the bore. The fastener precursor includes a middle portion extending across the interface, and engagement portions contacting the contours in each opposed end of the bore. The fastener precursor is then sintered in situ in the bore such that at least one of the middle portion, the first engagement portion and the second engagement portion of the fastener precursor shrink to mechanically interlock with the contours of the bore and form a mechanical fastener that forms a mechanical interlock between the first substrate and the second substrate across the interface.

In another example, the present disclosure is directed to a method that includes casting a metal part. The metal part includes at least one casting aperture having at least one contour. A sinterable composition is injected into the casting aperture and the sinterable composition is sintered in the aperture. The sinterable composition densifies and shrinks in at least one dimension and mechanically interlocks with the contour in the aperture to form a plug in the aperture.

In another example, the present disclosure is directed to a method including aligning a first countersunk bore in a first substrate and a second countersunk bore in a second substrate so that the first countersunk bore and the second countersunk bore overline each other. A sinterable fastener precursor composition is injected into at least one of the first and the second countersunk bores. The fastener precursor composition is sintered to form a mechanical fastener including a first portion contacting a first chamfered surface in the first countersunk bore, a second portion contacting a second chamfered surface in the second countersunk bore, and an elongate linear portion between the first portion and the second portion. The mechanical fastener applies a connecting force between the first chamfered surface and the second chamfered surface to maintain a connection between the first substrate and the second substrate. In some examples, the first substrate has a coefficient of thermal expansion (CTE) different from the CTE of the second substrate. In some examples, the first substrate is a heat shield and the second substrate is a ceramic part. In various examples, the fastener precursor composition includes a powdered metal or a ceramic, or may be produced with a fused filament fabrication process.

In another example, the present disclosure is directed to an assembly that includes a first substrate contacting a second substrate, a bore extending through the first substrate and the second substrate, and a sinterable fastener precursor composition in the bore. A mechanical fastener derived from the sinterable fastener composition is configured to mechanically interlock the first substrate to the second substrate.

Various examples of the invention have been described. These and other examples are within the scope of the following claims.

The invention claimed is:

1. A method for connecting or joining a first substrate and a second substrate across an interface between the first substrate and the second substrate, the method comprising:
   disposing a fastener precursor in a bore that extends into the first substrate and the second substrate; and
   sintering, without shrinking the first and second substrates, the fastener precursor in the bore, wherein the fastener precursor densifies and shrinks in at least one dimension to mechanically interlock with a contour in the bore and form a mechanical fastener in the bore, and wherein the mechanical fastener forms an interlock between the first substrate and the second substrate.

2. The method of claim 1, wherein the bore comprises a chamfer, and the mechanical fastener interlocks with the chamfer.

3. The method of claim 2, wherein the chamfer has an angle of about 60° to about 120°.

4. The method of claim 1, wherein the contour comprises an undercut region, and the fastener precursor mechanically interlocks with the undercut region.

5. The method of claim 1, wherein a major surface of the first substrate contacts a major surface of the second substrate.

6. The method of claim 1, wherein the fastener precursor comprises a sinterable composition deposited in the bore.

7. The method of claim 6, wherein the sinterable composition comprises a powdered metal.

8. The method of claim 6, wherein the sinterable composition comprises a ceramic material and a polymeric binder.

9. The method of claim 8, wherein the ceramic material is chosen from particles, whiskers, and combinations thereof.

10. The method of claim 1, wherein the fastener precursor comprises a sinterable fastener preform inserted in the bore.

11. The method of claim 10, wherein the sinterable fastener precursor is formed using a fused filament fabrication (FFF) process.

12. The method of claim 1, wherein the mechanical fastener has a cross-sectional shape comprising a trapezoidal first portion, a trapezoidal second portion, and an elongate linear middle portion between the trapezoidal first portion and the trapezoidal second portion.

13. The method of claim 12, wherein the mechanical fastener comprises a bore extending through the first portion, the middle portion, and the second portion.

14. The method of claim 1, wherein sintering the fastener precursor in the bore comprises applying pressure to the fastener precursor during the sintering to deform the fastener precursor.

15. The method of claim 1, wherein sintering the fastener precursor in the bore comprises applying pressure to opposed ends of the fastener precursor.

16. The method of claim 1, wherein the fastener precursor comprises an elongate linear central bore.

17. The method of claim 16, wherein sintering the fastener precursor in the bore comprises applying pressure to the fastener precursor with a tool positioned parallel to the elongate linear central bore and deforming an end of the fastener precursor.

18. The method of claim 1, wherein the coefficient of thermal expansion (CTE) of the first substrate differs from the CTE of the second substrate by at least about 5%.

* * * * *